(12) United States Patent
Okamoto et al.

(10) Patent No.: US 10,981,426 B2
(45) Date of Patent: Apr. 20, 2021

(54) SUSPENSION DEVICE FOR VEHICLES

(71) Applicant: MAZDA MOTOR CORPORATION, Hiroshima (JP)

(72) Inventors: Hiroyuki Okamoto, Hiroshima (JP); Kenji Hamada, Hiroshima (JP); Mitsuo Iwano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 91 days.

(21) Appl. No.: 16/462,923

(22) PCT Filed: Nov. 1, 2017

(86) PCT No.: PCT/JP2017/039527
§ 371 (c)(1),
(2) Date: May 21, 2019

(87) PCT Pub. No.: WO2018/092588
PCT Pub. Date: May 24, 2018

(65) Prior Publication Data
US 2019/0322149 A1    Oct. 24, 2019

(30) Foreign Application Priority Data
Nov. 21, 2016    (JP) .............................. JP2016-225791

(51) Int. Cl.
*B60G 11/16*    (2006.01)
*B60G 3/06*    (2006.01)
(Continued)

(52) U.S. Cl.
CPC ................ *B60G 11/16* (2013.01); *B60G 3/04* (2013.01); *B60G 3/06* (2013.01); *B60G 7/02* (2013.01);
(Continued)

(58) Field of Classification Search
CPC . B60G 11/16; B60G 3/04; B60G 3/06; B60G 7/02; B60G 15/02; B60G 15/062;
(Continued)

(56) References Cited

U.S. PATENT DOCUMENTS 3,573,880 A    4/1971 Sakai
5,048,860 A *  9/1991 Kanai .................... B60G 3/205
                                                    280/86.757
(Continued)

FOREIGN PATENT DOCUMENTS

EP    1165332 A1    1/2002
JP    S46-034275 Y2    11/1971
(Continued)

OTHER PUBLICATIONS

International Search Report issued in PCT/JP2017/039527; dated Dec. 26, 2017.

*Primary Examiner* — Keith J Frisby
(74) *Attorney, Agent, or Firm* — Studebaker & Brackett PC

(57) ABSTRACT

A suspension device for vehicles (a front suspension (10)) is disclosed in which, of connecting portions (23, 24) of a lower arm (20) and a tie rod (6) for connection to a knuckle (35), one of the connecting portions (24) which is close to the rear of the vehicle is offset inward in the vehicle width direction with respect to the other connecting portion (23) which is close to the front of the vehicle, in the steering neutral state. The center (P2) of a lower end portion of a coil spring (60) is offset outward in the vehicle width direction and rearward in the vehicle's longitudinal direction with respect to the center (P1) of an upper end portion of the coil spring (60).

7 Claims, 9 Drawing Sheets

(51) Int. Cl.
  *B60G 15/02* (2006.01)
  *B60G 3/04* (2006.01)
  *B60G 7/02* (2006.01)
  *B62D 7/16* (2006.01)
(52) U.S. Cl.
  CPC .............. *B60G 15/02* (2013.01); *B62D 7/166* (2013.01); *B60G 2200/142* (2013.01); *B60G 2200/1424* (2013.01); *B60G 2202/12* (2013.01); *B60G 2202/312* (2013.01); *B60G 2204/12422* (2013.01); *B60G 2204/143* (2013.01)
(58) Field of Classification Search
  CPC ...... B60G 15/063; B60G 15/06; B60G 15/07; B60G 2200/142; B60G 2200/44; B60G 2200/1424; B60G 2202/312; B60G 2202/12; B60G 2204/124; B60G 2204/1242; B60G 2204/12422; B62D 7/166; B62D 7/16
  USPC .... 280/124.146, 124.145, 124.154; 267/221, 267/220
  See application file for complete search history.

(56) References Cited

U.S. PATENT DOCUMENTS

| | | | |
|---|---|---|---|
| 7,513,514 | B1 | 4/2009 | Schlosser et al. |
| 2002/0089108 | A1 | 7/2002 | Imaizumi |
| 2005/0218622 | A1* | 10/2005 | Koumura ............... B60G 15/07 280/124.145 |
| 2015/0054244 | A1 | 2/2015 | Seo et al. |

FOREIGN PATENT DOCUMENTS

| | | | |
|---|---|---|---|
| JP | H03112708 A | | 5/1991 |
| JP | H09-300932 A | | 11/1997 |
| JP | 11048728 A | * | 2/1999 |
| JP | H11-48728 A | | 2/1999 |
| JP | H11-48729 A | | 2/1999 |
| JP | 2002-178736 A | | 6/2002 |
| JP | 2003-326932 A | | 11/2003 |
| JP | 2010-089549 A | | 4/2010 |
| JP | 2015-174514 A | | 10/2015 |

* cited by examiner

REAR ← → FRONT

SUSPENSION DEVICE FOR VEHICLES

TECHNICAL FIELD

The present invention relates to a suspension device for vehicles disposed between a vehicle body and a wheel.

BACKGROUND ART

Strut suspension devices for vehicles usually include a strut (a supporting pillar) consisting of a damper and a coil spring to support the vehicle body. Load input to a hub of a wheel of the vehicle from a road surface on which the vehicle is traveling is transmitted to the damper through a knuckle and other parts, which may cause a bending moment to act on the damper. The bending moment may increase frictional force at a sliding portion of the damper and thus keep the damper from smooth operation, which may decrease comfort of a passenger on board the vehicle and stability of steering the vehicle.

Such a technique relating to a strut suspension device, as described in Patent Document 1, is therefore well known that makes the load axis of a coil spring inclined outward in the vehicle width direction toward the bottom of the vehicle, with respect to the axis of the damper, and offsets the bending moment acting on the damper as described above with the spring force of the coil spring.

CITATION LIST

Patent Document

PATENT DOCUMENT 1: Japanese Unexamined Patent Publication No. 2003-326932

SUMMARY OF THE INVENTION

Technical Problem

In a strut front suspension as illustrated in FIG. 9, a lower arm 120 connected to the vehicle body through a subframe (a suspension member) 112 and other parts, and a tie rod 106 connected to a steering gearbox, have respective outer ends in the vehicle width direction connected to a knuckle 135, supporting the lower end of a damper 140, through connecting portions 123 and 124 (for example, ball joints). These connecting portions 123 and 124 are usually disposed inside with respect to a hub 132 of a wheel 130 in the vehicle width direction and remote from each other at a certain interval in the vehicle's longitudinal direction.

This type of front suspension has the pair of front and rear connecting portions 123 and 124 arranged inside with respect to the hub 132 of the wheel 130 in the vehicle width direction. When load is input to the hub 132 of the wheel 130 from the road surface on which the vehicle is traveling, a moment M100 (in FIG. 9, the moment M100 to turn the knuckle 135 and the damper 140 clockwise when viewed from the front of the vehicle body) is generated to turn the knuckle 135 and the damper 140 around a virtual axis extending along a virtual line L100 connecting between the pair of connecting portions 123 and 124.

As in the example of FIG. 9, in the case in which the connecting portion 124 close to the rear of the vehicle is disposed inside in the vehicle width direction with respect to the connecting portion 123 close to the front of the vehicle, the line L100 connecting between the pair of connecting portions 123 and 124 extends along a direction inclined inward in the vehicle width direction toward the rear of the vehicle. Once the moment M100 is generated, this configuration causes a load F100 to be input to the upper end of the damper 140 from the vehicle body, in a direction inclined rearward toward the outside of the vehicle in the vehicle width direction.

The load F100 input to the upper end of the damper 140 therefore includes a component Fx in a direction toward the outside in the vehicle width direction and a component Fy in a direction toward the rear in the vehicle's longitudinal direction.

The above conventional configuration has a coil spring 160 the load axis of which is inclined in the vehicle width direction with respect to the axis of the damper 140, and this configuration is capable of offsetting the bending moment acting on the damper 140 by the component Fx in the vehicle width direction of the load F100 input to the upper end of the damper 140, by the spring force of the coil spring 160.

In the conventional configuration, however, the load axis of the coil spring 160 is not inclined in the vehicle's longitudinal direction with respect to the vertical direction of the vehicle. This configuration is therefore not capable of offsetting the bending moment acting on the damper 140 by the component Fy in the vehicle's longitudinal direction of the load F100 input to the upper end of the damper 140, by the spring force of the coil spring 160. The conventional configuration therefore still has room for improvement to reduce the bending moment on the damper.

In view of the foregoing background, it is an object of the present invention to provide a suspension device for vehicles capable of further effectively reducing a bending moment acting on a damper of the suspension device and allowing the damper to operate smoothly.

Solution to the Problem

In order to achieve the above object, the present invention provides following first and second suspension devices for vehicles.

A first suspension device for a vehicle includes a knuckle configured to support a wheel of the vehicle; a lower arm configured to connect the knuckle to a vehicle body of the vehicle; a tie rod configured to connect the knuckle to a steering system; a damper having an upper end connected to the vehicle body and a lower end connected to the knuckle, the damper being capable of extending and retracting in an axial direction of the damper; a pair of upper and lower spring supporters mounted on the damper such that a distance from each other is changed in the axial direction of the damper according to the extending and retracting of the damper; and a coil spring disposed between the pair of upper and lower spring supporters. Of a connecting portion of the lower arm for connection to the knuckle and a connecting portion of the tie rod for connection to the knuckle, one of the connecting portions which is close to a rear of the vehicle is offset inward in a vehicle width direction with respect to the other connecting portion which is close to a front of the vehicle, in a steering neutral state. A center of a lower end portion of the coil spring is offset outward in the vehicle width direction and rearward in a vehicle's longitudinal direction with respect to a center of an upper end portion of the coil spring.

The center of the lower end portion of the coil spring is used herein as the central position in the vehicle width direction and in the vehicle's longitudinal direction of the lowermost winding of the coil spring. The center of the upper end portion of the coil spring is the central position in the vehicle width direction and in the vehicle's longitudinal direction of the uppermost winding of the coil spring.

The center of the lower end portion of the coil spring is offset outward in the vehicle width direction and rearward in the vehicle's longitudinal direction with respect to the center of the upper end portion of the coil spring. This configuration allows spring force of the coil spring to act on the lower spring supporter in a direction inclined outward in the vehicle width direction and rearward in the vehicle's longitudinal direction, toward the bottom of the vehicle, and to act on the upper spring supporter in a direction inclined inward in the vehicle width direction and frontward in the vehicle's longitudinal direction, toward the top of the vehicle.

When a load is input to the wheel from the road surface, and such a moment is generated that rotates the knuckle and the damper about a virtual axis extending along a virtual line connecting between the connecting portions of the lower arm and the tie rod for connection to the knuckle, a load is input to the upper end of the damper from the vehicle body in a direction inclined rearward in the vehicle's longitudinal direction toward the outside in the vehicle width direction. This load is effectively offset with the spring force of the above coil spring acting on the upper end of the damper through the upper spring supporter.

This configuration can effectively keep the bending moment from acting on the damper, which allows the damper to operate smoothly. This configuration thus can improve comfort of a passenger on board the vehicle and increase stability of steering the vehicle.

In an embodiment of the first suspension device for a vehicle, the center of the lower end portion of the coil spring is offset outward in the vehicle width direction and rearward in the vehicle's longitudinal direction with respect to the axis of the damper, at a vertical position of the center of the lower end portion in a vertical direction of the vehicle.

As described above, the center of the lower end portion of the coil spring is offset outward in the vehicle width direction and rearward in the vehicle's longitudinal direction with respect to the axis of the damper, at the vertical position of the center in the vertical direction of the vehicle. Thus, even if the damper is arranged with its axis inclined rearward in the vehicle's longitudinal direction toward the top of the vehicle, the coil spring wound around the circumference of the damper is easily inclined frontward in the vehicle's longitudinal direction toward the top of the vehicle. This configuration therefore allows the spring force of the coil spring to easily act on the upper end of the damper in a direction inclined inward in the vehicle width direction and frontward in the vehicle's longitudinal direction, toward the top of the vehicle.

In a different embodiment of the first suspension device for a vehicle, a strut comprised of the damper and the coil spring is mounted on each of wheels on right and left sides of the vehicle, and offset amounts of the center of the lower end portion of the coil spring with respect to the center of the upper end portion of the coil spring in the vehicle width direction and in the vehicle's longitudinal direction are the same between the struts on the right and left sides of the vehicle body.

As described above, the offset amounts of the center of the lower end portion of the coil spring with respect to the center of the upper end portion of the coil spring in the vehicle width direction and in the vehicle's longitudinal direction are the same between the struts on the right and left sides of the vehicle body. This configuration allows the spring force of the coil springs to act equally on the upper ends of the dampers of the struts on the right and left side of the vehicle, and can effectively reduce the bending moment acting on the dampers.

In the different embodiment, an offset amount of a lower end tip of the coil spring with respect to the axis of the damper in the vehicle's longitudinal direction may differ between the struts on the right and left sides of the vehicle body, at a vertical position of the lower end tip of the coil spring in the vertical direction of the vehicle.

Although the amount of offset of the lower end tip of the coil spring to the axis of the damper in the vehicle's longitudinal direction differs between the struts on the right and left sides of the vehicle at the position of the lower end tip of the coil spring in the vertical direction of the vehicle, this asymmetric arrangement of the struts on the right and left sides of the vehicle can effectively reduce the bending moment acting on the dampers of the struts on the right and left sides of the vehicle in an equal manner.

In the above different embodiment, the coil spring of the strut on the right side of the vehicle body and the coil spring of the strut on the left side of the vehicle body may be wound in a same direction from respective upper ends toward lower ends.

The coil springs wound in the same direction can effectively reduce the bending moment acting on the dampers of the respective struts on the right and left sides of the vehicle in an equal manner.

A second suspension device for vehicles includes: a knuckle configured to support a wheel of the vehicle; a lower arm configured to connect the knuckle to a vehicle body of the vehicle; a tie rod configured to connect the knuckle to a steering system; a damper having an upper end connected to the vehicle body and a lower end connected to the knuckle, the damper being capable of extending and retracting in an axial direction of the damper; a pair of upper and lower spring supporters mounted on the damper such that a distance from each other is changed in the axial direction of the damper according to the extending and retracting of the damper; and a coil spring disposed between the pair of upper and lower spring supporters. Of a connecting portion of the lower arm for connection to the knuckle and a connecting portion of the tie rod for connection to the knuckle, one of the connecting portions which is close to a rear of the vehicle is offset inward in a vehicle width direction with respect to the other connecting portion which is close to a front of the vehicle, in a steering neutral state. The coil spring has a load axis arranged along a direction inclined outward in the vehicle width direction and rearward in a vehicle's longitudinal direction, toward a bottom of the vehicle.

The load axis of the coil spring is used herein as a virtual axis indicating the direction of load transferred between the pair of upper and lower spring supporters through the coil spring.

As described above, the load axis of the coil spring is arranged along a direction inclined outward in the vehicle width direction and rearward in the vehicle's longitudinal direction, toward the bottom of the vehicle. This arrangement allows the spring force of the coil spring along a direction inclined inward in the vehicle width direction and frontward in the vehicle's longitudinal direction, toward the top of the vehicle, to act on the upper end of the damper through the upper spring supporter.

If the moment is generated and a load is input to the upper end of the damper from the vehicle body in a direction inclined rearward in the vehicle's longitudinal direction toward the outside in the vehicle width direction, such load can be effectively offset by the spring force of the coil spring.

That is, this configuration can effectively reduce the bending moment acting on the damper, which allows the damper to operate smoothly. This configuration can therefore improve comfort of a passenger on the vehicle and increase stability of steering the vehicle.

In an embodiment of the second suspension device for a vehicle, a strut comprised of the damper and the coil spring is mounted on each of wheels on right and left sides of the vehicle body, and a load axis of the coil spring of the strut on the right side of the vehicle body and a load axis of the coil spring of the strut on the left side of the vehicle body are bilaterally symmetric when viewed in the vehicle's longitudinal direction and in a vertical direction of the vehicle.

The load axes of the coil springs of the struts on the right and left sides of the vehicle are bilaterally symmetric when viewed in both of the vehicle's longitudinal direction and the vertical direction of the vehicle. This symmetric arrangement allows the spring force of the coil springs to act equally on the upper ends of the dampers of the struts on the right and left sides of the vehicle, and can effectively reduce the bending moment acting on the dampers.

In the embodiment of the second suspension device for a vehicle, an offset amount of a lower end tip of the coil spring with respect to the axis of the damper in the vehicle's longitudinal direction may differ between the struts on the right and left sides of the vehicle body, at a vertical position of the lower end tip of the coil spring in the vertical direction of the vehicle.

Although the amount of offset of the lower end tip of the coil spring to the axis of the damper in the vehicle's longitudinal direction differs between the struts on the right and left sides of the vehicle at the position of the lower end tip of the coil spring in the vertical direction of the vehicle, this asymmetric arrangement of the struts on the right and left sides of the vehicle can effectively reduce the bending moment acting on the dampers of the struts on the right and left sides of the vehicle in an equal manner.

In the embodiment of the second suspension device for a vehicle, the coil spring of the strut on the right side of the vehicle body and the coil spring of the strut on the left side of the vehicle body may be wound in a same direction from respective upper ends toward lower ends.

The coil springs wound in the same direction can effectively reduce the bending moment acting on the dampers of the respective struts on the right and left sides of the vehicle in an equal manner.

Advantages of the Invention

As described above, a suspension device for a vehicle of the present invention is capable of effectively reducing the bending moment acting on a damper, which allows the damper to operate smoothly, and accordingly improves comfort of a passenger on board the vehicle and increases stability of steering the vehicle.

DESCRIPTION OF EMBODIMENTS

Exemplary embodiments will now be described in detail below, with reference to the drawings.

Figure 1:
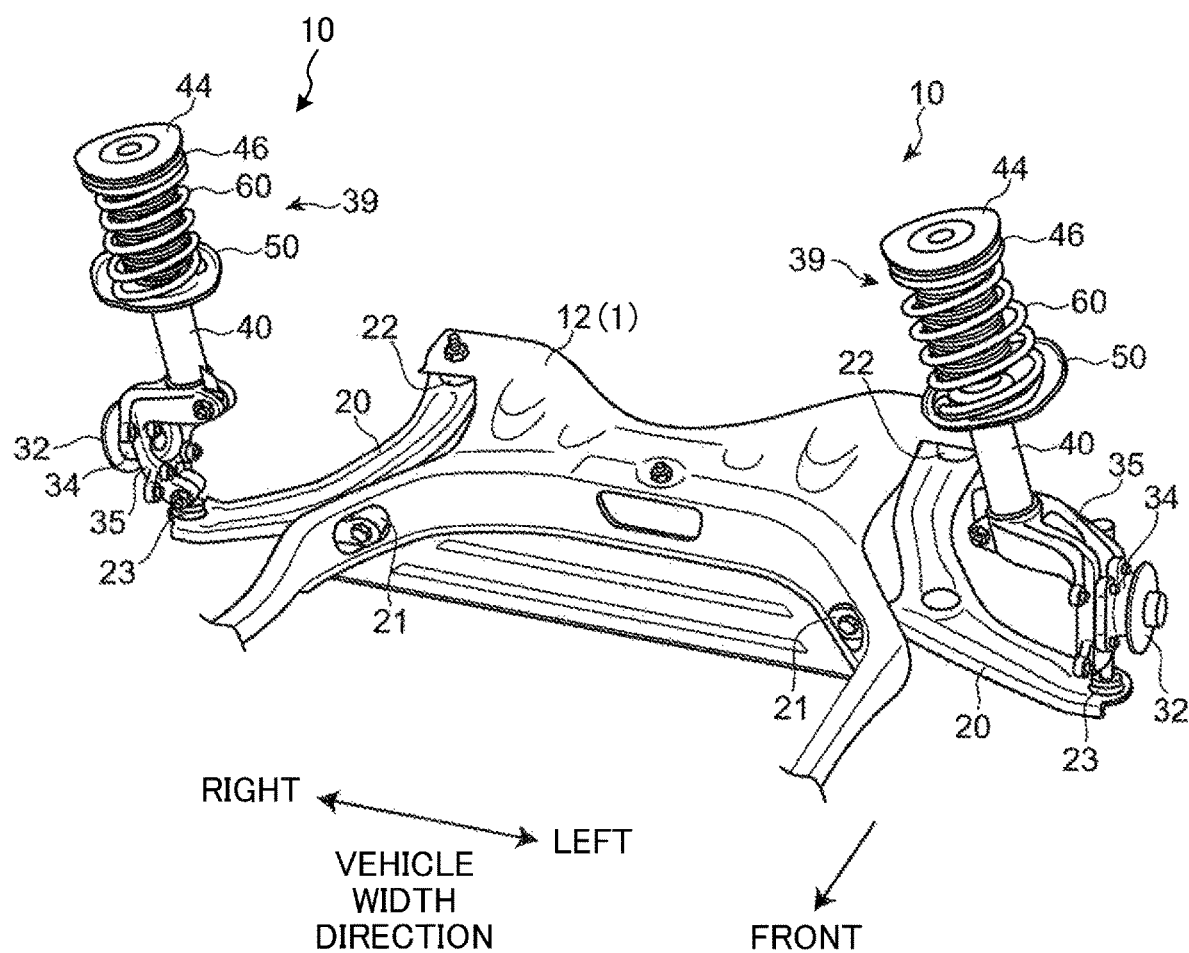
FIG. 1 is a perspective view of front suspensions as suspension devices for vehicles according to an exemplary embodiment.

FIG. 1 illustrates right and left front suspensions 10 (hereinafter, simply referred to as suspensions 10) as suspension devices for vehicles according to an exemplary embodiment. In the following description, the front and rear, left and right, and top and bottom of a vehicle body 1 (see FIG. 1 to FIG. 3) will be simply referred to as the front and rear (or longitudinal direction), left and right (or width direction), and top and bottom (or vertical direction).

Each suspension 10 is a strut suspension disposed between a wheel 30 (in this example, a front wheel which is a steering wheel) of a vehicle and the vehicle body 1. The suspension 10 includes a knuckle 35 that rotatably supports a hub 32 of the wheel 30 through a bearing 34, a lower arm 20 that connects the knuckle 35 to a subframe (sometimes called a suspension cross-member) 12 constituting a part of the vehicle body 1, and a strut 39.

The subframe 12 extends in the vehicle width direction and is connected to, for example, right and left front side frames (not illustrated) of the vehicle body 1. The strut 39 is provided between the knuckle 35 and the vehicle body 1 (in this embodiment, a wheel housing 2 (see FIG. 3)).

Figure 2:
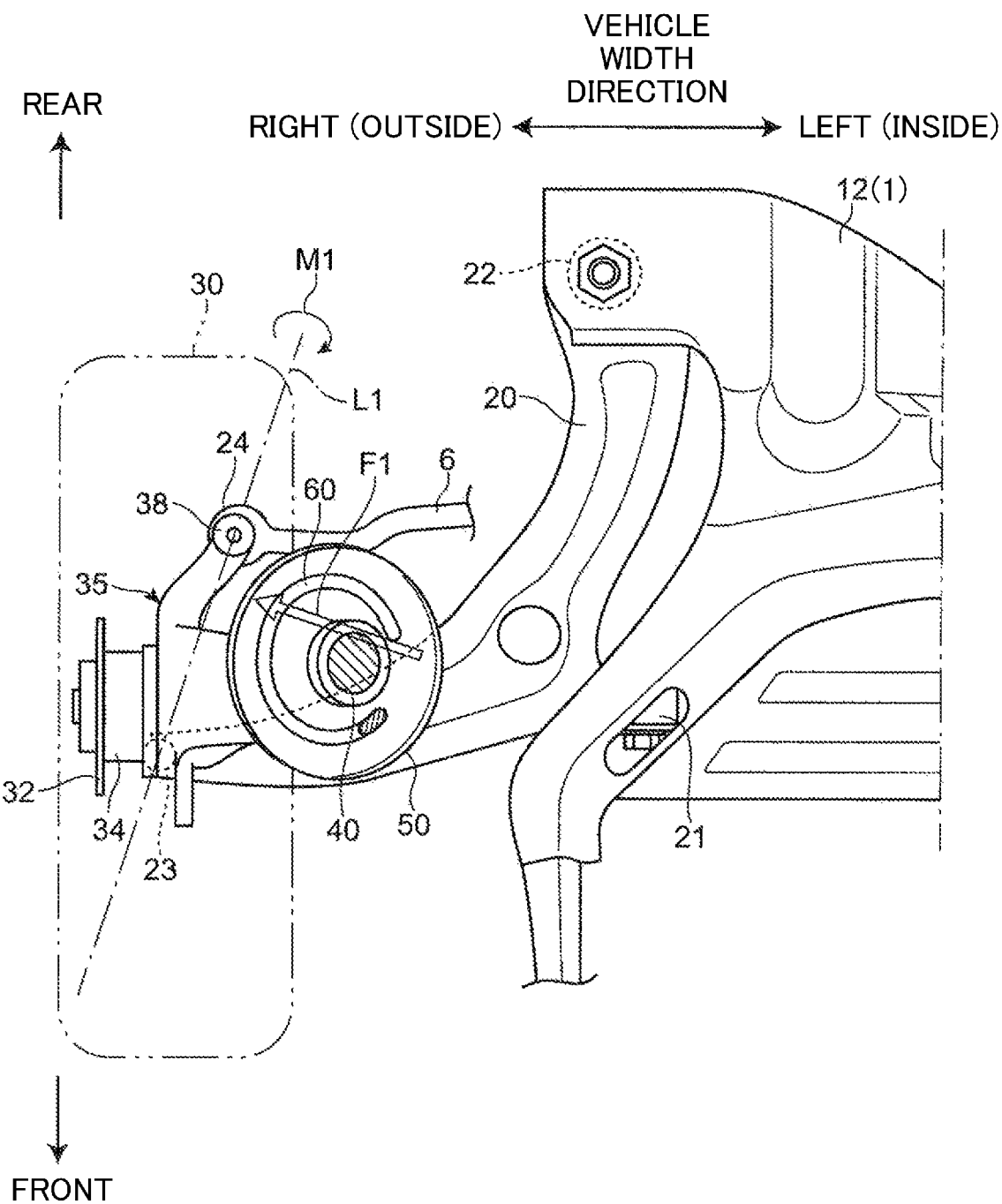
FIG. 2 is a plan view of the front suspension on the right side of the vehicle as viewed from above the vehicle.
Figure 3:
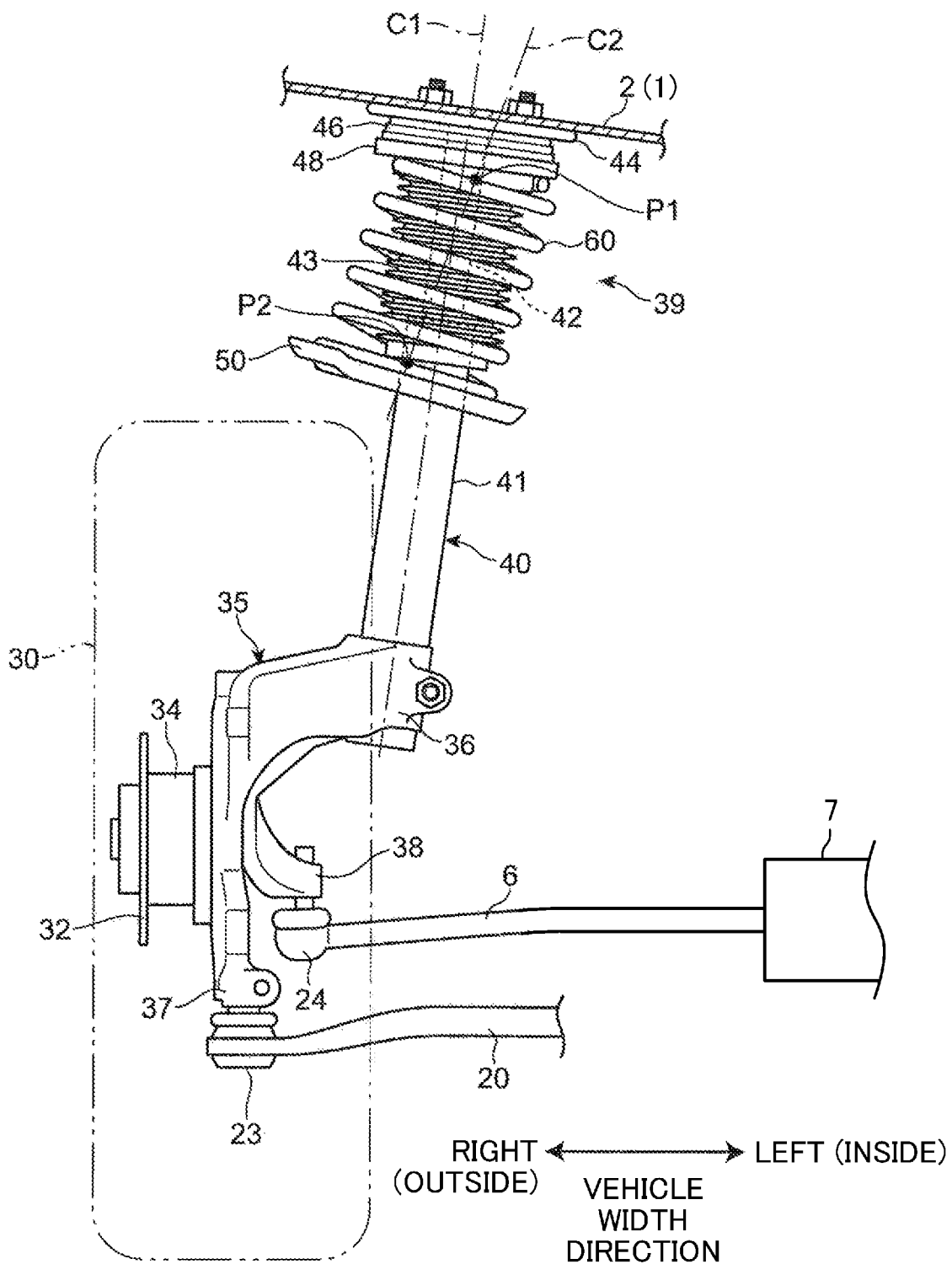
FIG. 3 is a front view of the front suspension on the right side of the vehicle as viewed from the front side of the vehicle.
Figure 4:
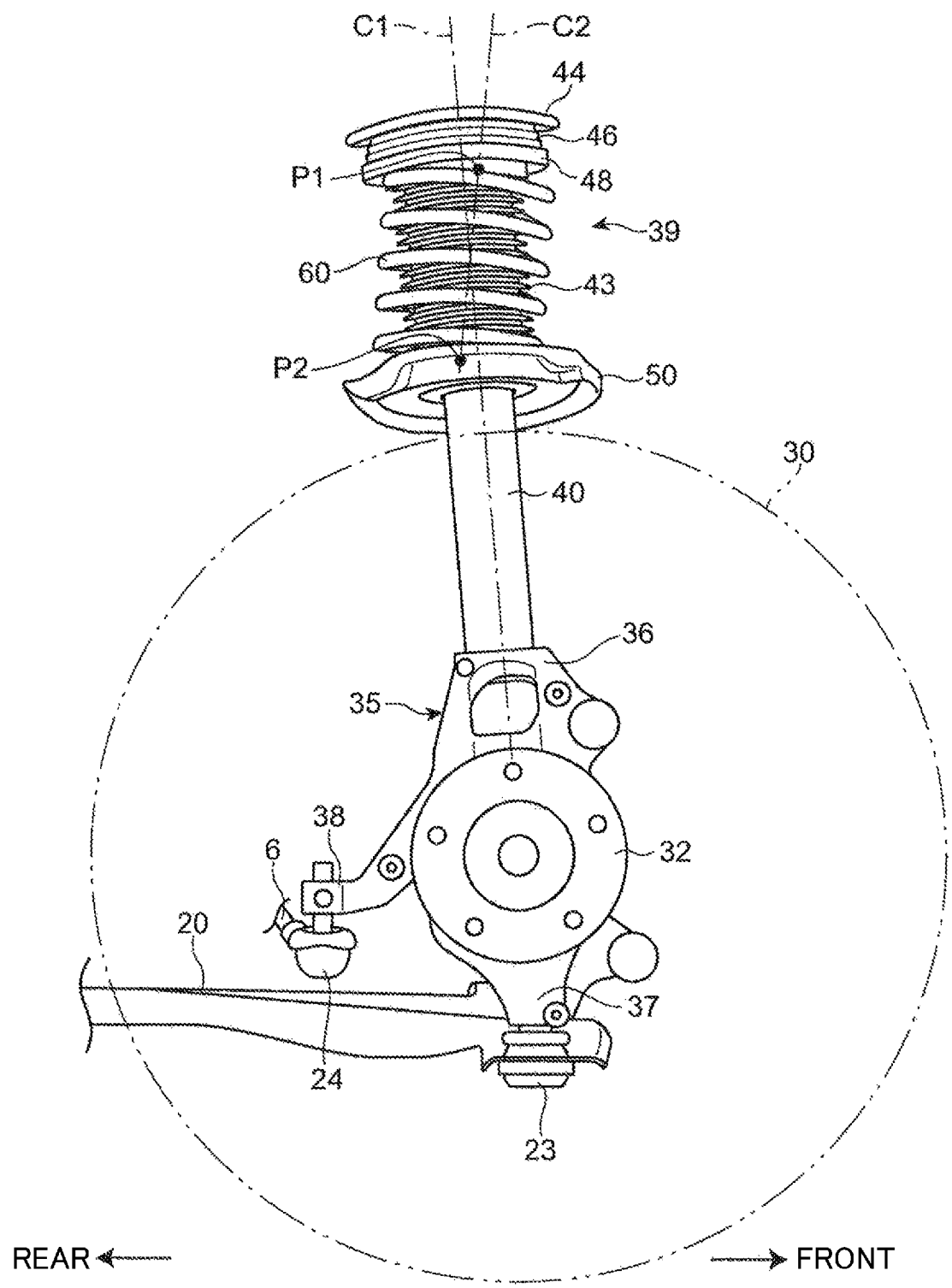
FIG. 4 is a side view of the front suspension on the right side of the vehicle as viewed from the right side of the vehicle.

As illustrated in FIG. 2 to FIG. 4, the knuckle 35 has a first connected portion 36 connected to the damper 40 at its upper end, a second connected portion 37 connected to the lower arm 20 at its lower end, and a third connected portion 38 connected to a tie rod 6 at its rear end. The first to third connected portions 36 to 38 are disposed inside with respect to the hub 32 in the vehicle width direction.

A separate knuckle arm extending rearward may be connected to the knuckle 35. In this case, the third connected portion 38 may be arranged on an end (rear end) of the knuckle arm.

As illustrated in FIG. 1 and FIG. 2, an inner portion of the lower arm 20 in the vehicle width direction extends in the vehicle's longitudinal direction, and the lower arm 20 curvedly extends outward in the vehicle width direction from a front end of the inner portion.

The inner portion of the lower arm 20 in the vehicle width direction is connected to the subframe 12 through a pair of front and rear connecting portions 21 and 22. The lower arm 20 is supported by the subframe 12 so as to be rotatable about an axis extending in the vehicle's longitudinal direction at the front connecting portion 21, and supported by the subframe 12 so as to be rotatable about an axis extending in the vertical direction at the rear connecting portion 22.

As illustrated in FIG. 3 and FIG. 4, an outer end of the lower arm 20 in the vehicle width direction is connected to the second connected portion 37 of the knuckle 35 through a first ball joint 23. The knuckle 35 is accordingly connected to the subframe 12 (that is, the vehicle body 1) through the lower arm 20. The first ball joint 23 corresponds to a connecting portion of the lower arm 20 connecting to the knuckle 35.

As illustrated in FIG. 2 and FIG. 3, the tie rod 6 is disposed so as to extend in the vehicle width direction. An inner portion of the tie rod 6 in the vehicle width direction is connected to a steering gearbox 7 of a steering system. The tie rod 6 is therefore translated in the vehicle width direction in conjunction with a steering rack and other parts of the steering gearbox 7, in response to steering operation.

An outer end of the tie rod 6 in the vehicle width direction is connected to a third connected portion 38 of the knuckle 35 through a second ball joint 24. The knuckle 35 is accordingly connected with the steering system (the steering gearbox 7) through the tie rod 6. The second ball joint 24 corresponds to a connecting portion of the tie rod 6 connecting to the knuckle 35.

The second ball joint 24 is located in a rearward position of the first ball joint 23. In the steering neutral state, the second ball joint 24 is offset inward with respect to the first ball joint 23 in the vehicle width direction.

The translational move of the tie rod 6 in the vehicle width direction in response to the steering operation causes the third connected portion 38 of the knuckle 35 to move in the vehicle width direction, whereby the wheel 30 supported by the knuckle 35 is steered.

As illustrated in FIG. 3, the strut 39 is mainly comprised of a coil spring 60 disposed between the wheel 30 and the vehicle body 1 (the wheel housing 2) to absorb impact on the wheel 30, and the damper 40 which absorbs vibration of the coil spring 60. The damper 40 is extendable and retractable between the wheel 30 and the vehicle body 1 (the wheel housing 2).

The damper 40 is an extendable and retractable damper having a cylinder 41 and a piston rod 42. With the piston rod 42 sliding relative to the cylinder 41, the damper 40 extends and retracts in the direction of an axis C1 of the damper 40.

The axis C1 of the damper 40 is inclined relative to the vertical direction. Specifically, the axis C1 of the damper 40 is inclined inward in the vehicle width direction toward the top of the vehicle (see FIG. 3) and inclined rearward toward the top of the vehicle (see FIG. 4).

The cylinder 41 has its lower end coupled and fixed to the first connected portion 36 of the knuckle 35. A lower spring seat 50 is mounted on a portion near the upper end of the cylinder 41. The lower spring seat 50 is fixed to the outer peripheral surface of the cylinder 41, for example, by welding. A seat rubber 54 (see FIG. 5) is mounted on the upper surface of the lower spring seat 50.

The piston rod 42 is upwardly projected from the cylinder 41. An upper mount 44 is mounted on the upper end of the piston rod 42. The upper mount 44 is fixed to the wheel housing 2 of the vehicle body 1, for example, with a bolt. The upper end of the damper 40 is accordingly connected to the vehicle body 1 through the upper mount 44.

An upper spring seat 46 is mounted on the bottom of the upper mount 44. The upper spring seat 46 is attached to the upper end of the piston rod 42 through the upper mount 44. This configuration makes the distance between the upper spring seat 46 and the lower spring seat 50 variable in the axial direction of the damper 40, in response to extension and retraction of the damper 40. A seat rubber 48 is mounted on the lower surface of the upper spring seat 46.

The piston rod 42 between the upper end of the cylinder 41 and the upper spring seat 46 is covered by, for example, an accordion dust cover 43.

The coil spring 60 is disposed between the upper spring seat 46 and the lower spring seat 50. The seat rubber 48 is interposed between the coil spring 60 and the upper spring seat 46, and the seat rubber 54 is interposed between the coil spring 60 and the lower spring seat 50. This configuration contributes to reducing impact and thus reducing noise. The upper spring seat 46 and the lower spring seat 50 correspond to a pair of upper and lower spring supporters.

The coil spring 60 is arranged to wind around the piston rod 42 and the dust cover 43 of the damper 40. In the illustrated example, the coil spring 60 is wound clockwise from its upper end toward its lower end. This winding direction is the same between the right and left struts 39. The right and left struts 39 may have the coil springs 60 each of which is wound counterclockwise from its upper end toward its lower end.

As illustrated in FIG. 3 and FIG. 4, the lower end portion of the coil spring 60 has a center P2 offset outward in the vehicle width direction and rearward in the vehicle's longitudinal direction with respect to a center P1 of the upper end portion. Further, at the vertical position of the center P2, the center P2 of the lower end portion of the coil spring 60 is offset outward in the vehicle width direction and rearward in the vehicle's longitudinal direction with respect to the axis C1 of the damper 40.

The offset amounts of the center P2 of the lower end portion of the coil spring 60 with respect to the center P1 of the upper end portion in the vehicle width direction and in the vehicle's longitudinal direction are the same between the right and left struts 39. Likewise, the offset amounts of the center P2 of the lower end portion of the coil spring 60, at the vertical position of the center P2, with respect to the axis C1 of the damper 40 in the vehicle width direction and the vehicle's longitudinal direction are the same between the right and left struts 39.

As illustrated in FIG. 3, the coil spring 60 as a whole is inclined inward in the vehicle width direction toward the top of the vehicle. Furthermore, as illustrated in FIG. 4, the coil spring 60 as a whole is inclined frontward toward the top of the vehicle.

As illustrated in FIG. 3 and FIG. 4, the coil spring 60 has a load axis C2 along a direction inclined outward in the vehicle width direction and rearward in the vehicle's longitudinal direction, toward the bottom of the vehicle. As illustrated in FIG. 3, with regard to inclination in the vehicle width direction relative to the vertical direction, the load axis C2 of the coil spring 60 is inclined outward in the vehicle width direction toward the bottom of the vehicle, like the axis C1 of the damper 40, but the load axis C2 of the coil spring 60 is inclined at a larger angle relative to the vertical direction than the axis C1 of the damper 40 is inclined relative to the vertical direction. With regard to inclination in the vehicle's longitudinal direction relative to the vertical direction, as illustrated in FIG. 4, the load axis C2 of the coil spring 60 is inclined rearward toward the bottom of the vehicle, unlike the axis C1 of the damper 40.

The spring force of the coil spring 60 in such a posture described above may act on the lower spring seat 50 in a direction inclined outward in the vehicle width direction and rearward in the vehicle's longitudinal direction, toward the bottom of the vehicle, and on the upper spring seat 46 in a direction inclined inward in the vehicle width direction and frontward in the vehicle's longitudinal direction, toward the top of the vehicle.

A load F2 (see FIG. 8) along a direction inclined inward in the vehicle width direction and frontward in the vehicle's longitudinal direction, toward the top of the vehicle, can thus be input to the upper end of the damper 40 from the coil spring 60 through the upper spring seat 46 and the upper mount 44.

As illustrated in FIG. 2, provided that the center of the first ball joint 23 and the center of the second ball joint 24 are connected by a virtual line L1, the line L1 is disposed along a direction inclined inward in the vehicle width direction toward the rear of the vehicle.

Thus, if a load is input to the hub 32 of the wheel 30 from the road surface on which the vehicle is traveling, such a load generates a moment M1 (in the right strut 39 in FIG. 2, the moment M1 to rotate the knuckle 35 and the damper 40 clockwise when viewed from the front) to rotate the knuckle 35 and the damper 40 about a virtual axis along the line L1. At this moment, a load F1 is input to the upper end of the damper 40 from the wheel housing 2 of the vehicle body 1 through the upper mount 44.

The load F1 input to the upper end of the damper 40 from the vehicle body 1 acts in a direction inclined rearward toward the outside in the vehicle width direction. On the other hand, the load F2 input to the upper end of the damper 40 from the coil spring 60 (the upward load of an arrow indicating both upward and downward directions in FIG. 8) acts in a direction inclined frontward toward the inside in the vehicle width direction. Thus, the load F1 from the vehicle body 1 is effectively offset by the load F2 from the coil spring 60.

According to this embodiment, a bending moment acting on the damper 40 is effectively reduced, which can make the damper 40 operate more smoothly and improve comfort of a passenger on board the vehicle and increase stability of steering the vehicle.

Figure 5:
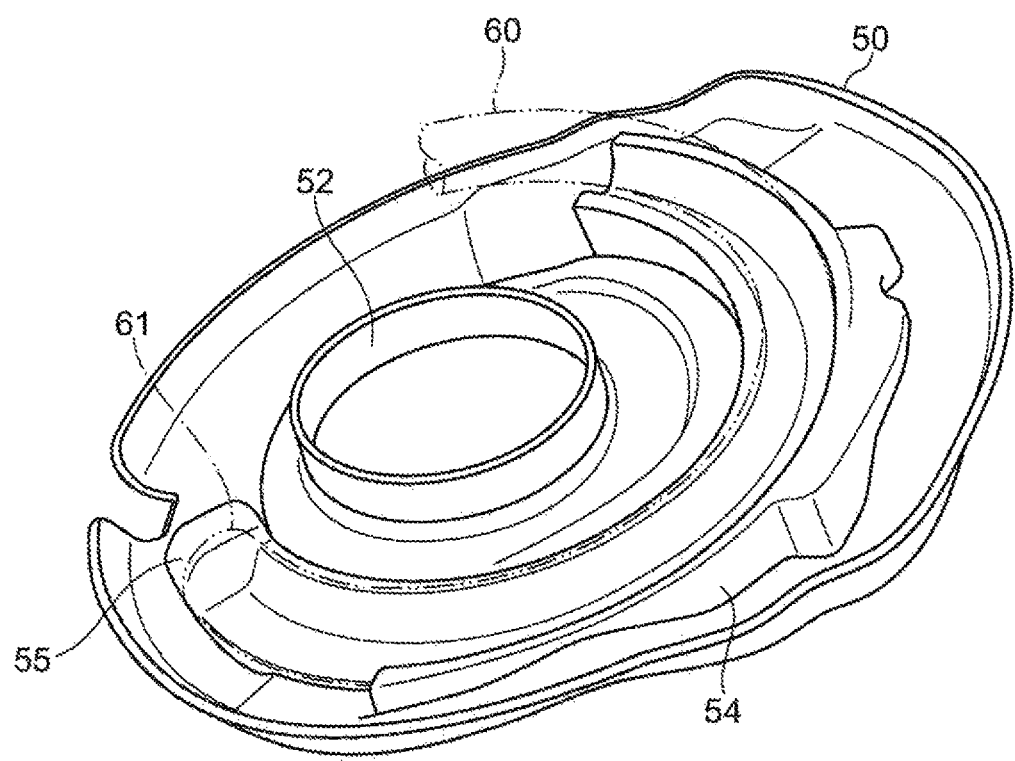
FIG. 5 is a perspective view that illustrates an exemplary configuration of a lower spring seat.

As illustrated in FIG. 5, the upper surface of the lower spring seat 50 has recesses and projections which allow the seat rubber 54 to be positioned at a predetermined location. The seat rubber 54 is properly positioned by being placed on the lower spring seat 50. The coil spring 60 is positioned with its lower end placed in a groove of the seat rubber 54.

The seat rubber 54 is substantially arcuate in plan view, and has a stopper 55 at an end thereof in the circumferential direction. The coil spring 60 is accurately positioned by being set on the seat rubber 54 with its lower end tip in contact with the stopper 55. The load axis C2 of the coil spring 60 is accordingly accurately disposed along the inclined direction described above, thereby reducing the bending moment acting on the damper 40.

In this embodiment, similarly to conventional suspension devices, components, 40, 44, 46, 48, 50, 54, and 60 of the strut 39 are the same between the right and left struts 39. In conventional suspension devices, the right and left struts are usually arranged such that circumferential phases of the entire struts, including coil springs, are shifted 180 degrees from each other. The present embodiment is different from such conventional devices in the phase relation between the coil springs 60 of the right and left struts 39.

Figure 6:
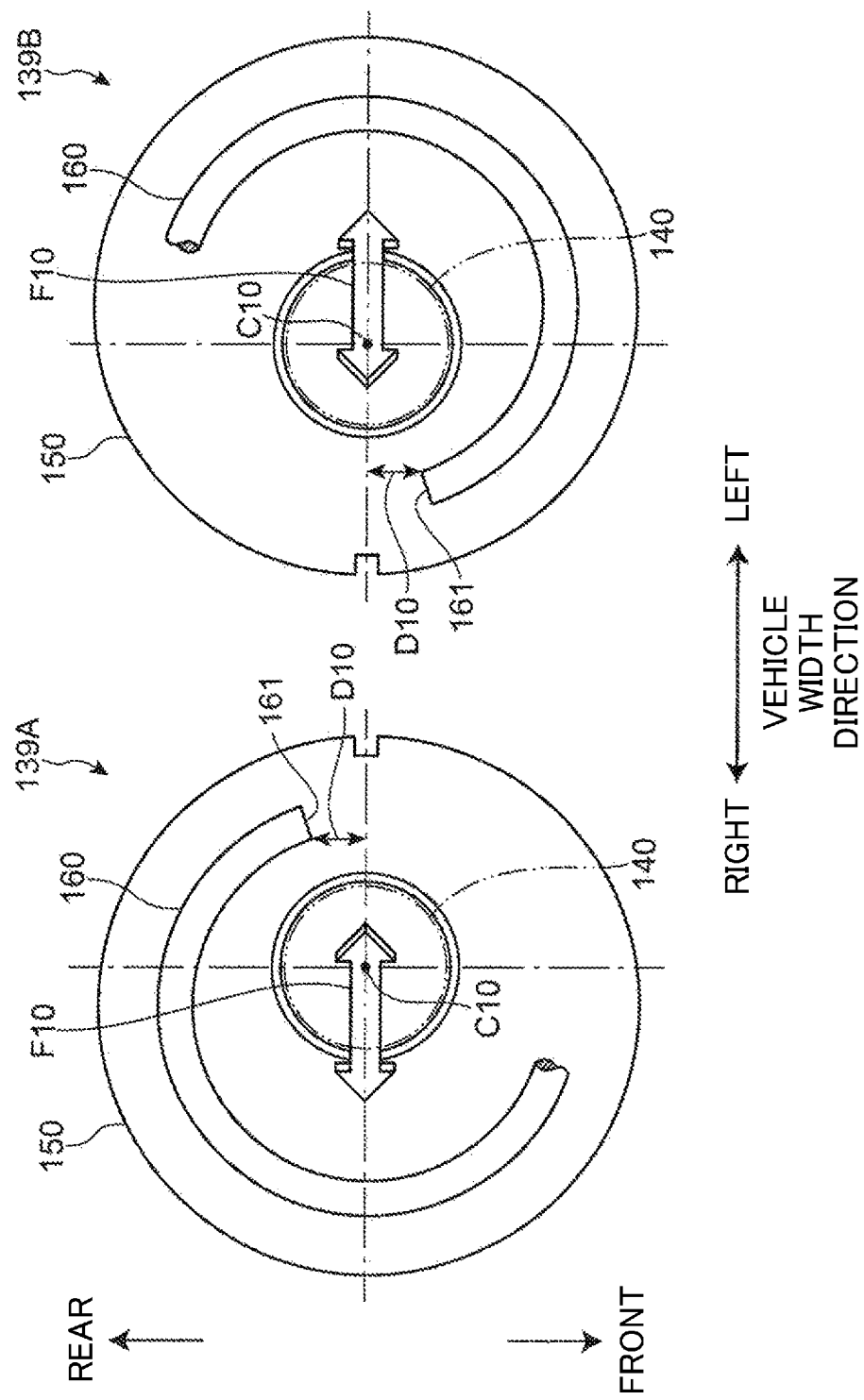
FIG. 6 is a plan view of right and left lower spring seats and lower end portions of coil springs in a first comparative example as viewed from above the vehicle.
Figure 7:
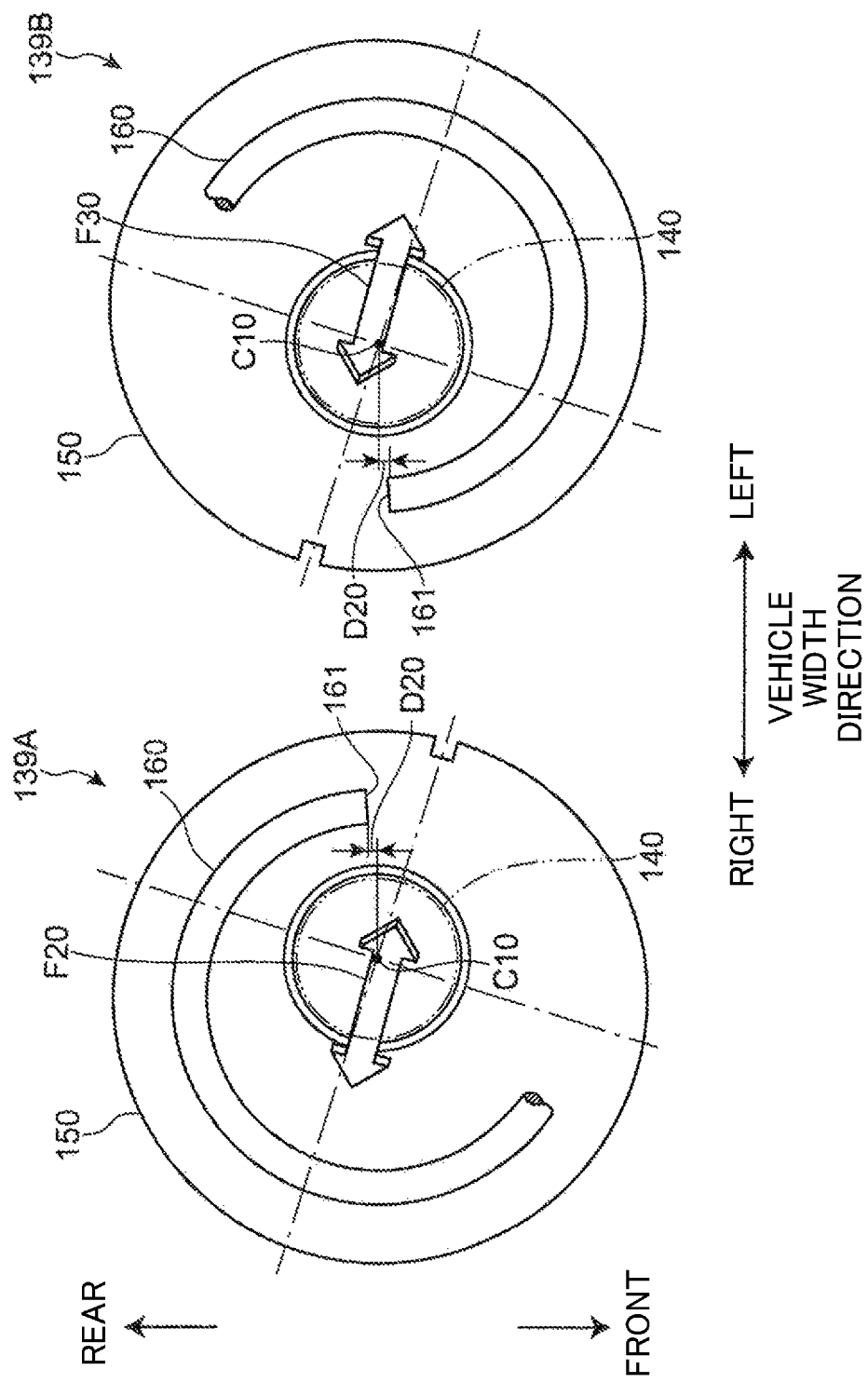
FIG. 7 is a plan view of right and left lower spring seats and lower end portions of coil springs in a second comparative example as viewed from above the vehicle.
Figure 8:
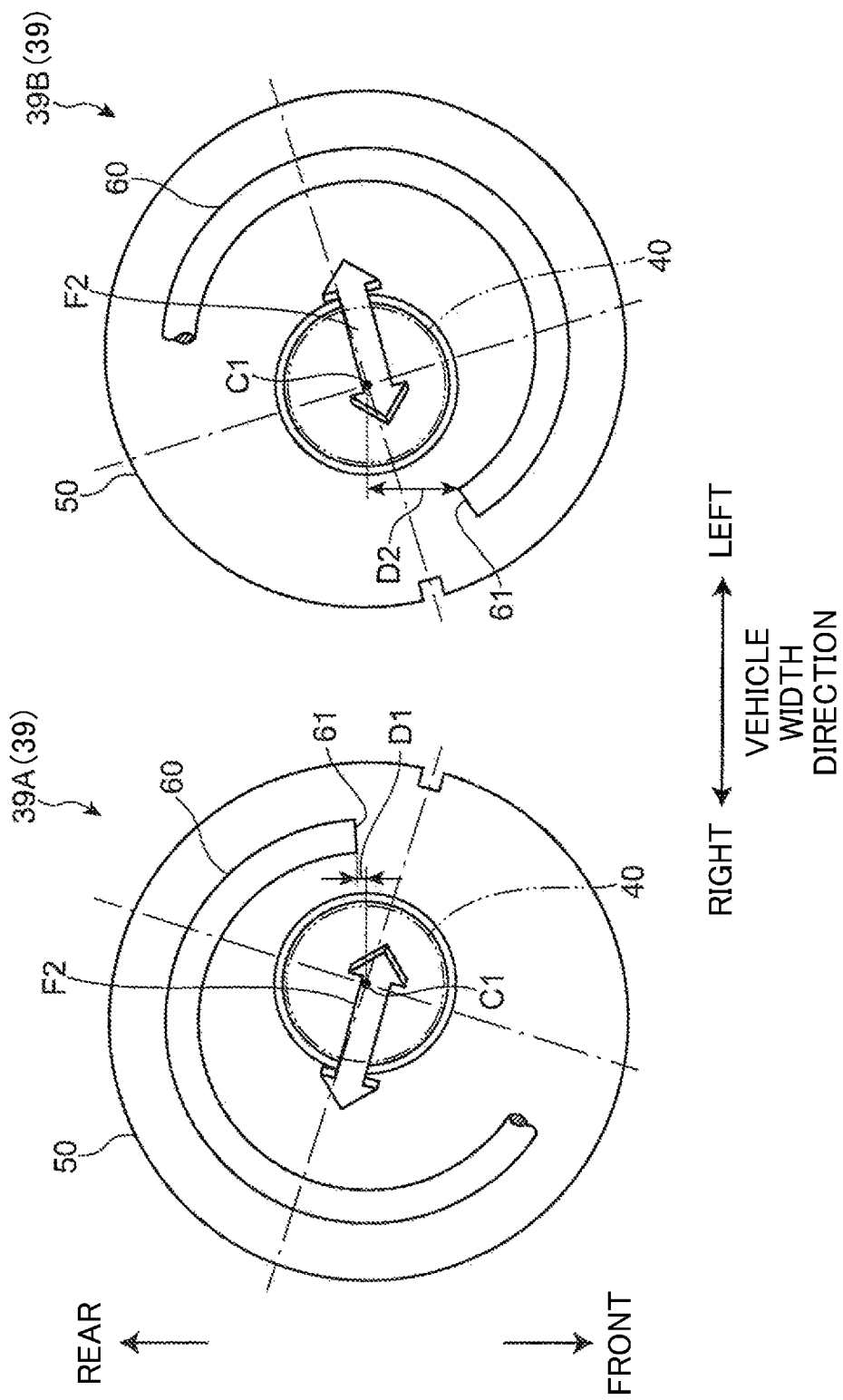
FIG. 8 is a plan view of right and left lower spring seats and lower end portions of coil springs of this embodiment as viewed from above the vehicle.
Figure 9:
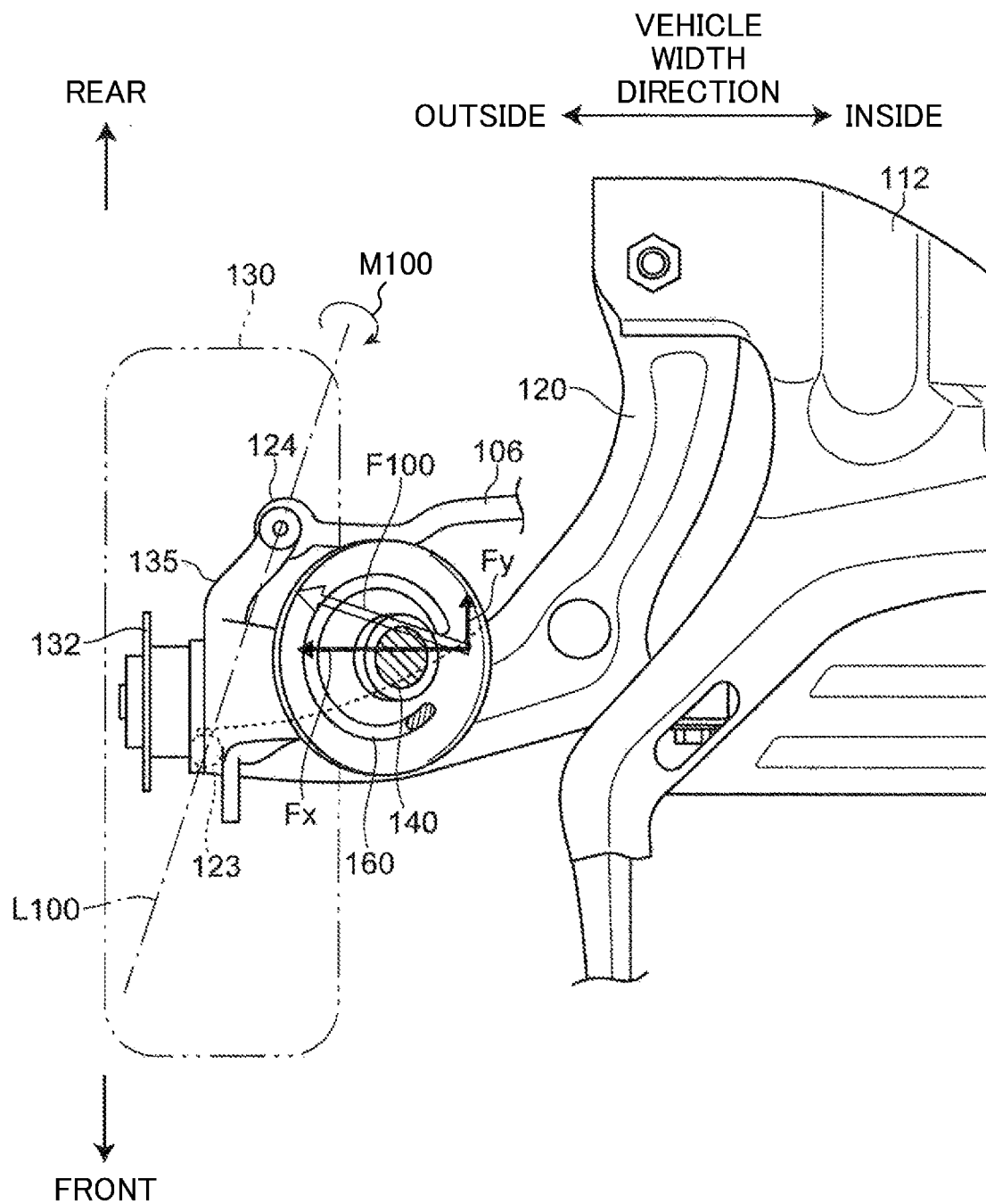
FIG. 9 is a plan view of an example conventional suspension device for vehicles.

The configuration relating to the phases of the coil springs 60 will now be described with reference to FIG. 6 illustrating a first comparative example, FIG. 7 illustrating a second comparative example, and FIG. 8 illustrating the configuration of the present embodiment.

Similarly to the generally known strut suspensions, the first comparative example of FIG. 6 is configured such that the load axes of the coil springs 160 are arranged parallel with each other in the vehicle width direction when viewed in the vertical direction.

In the first comparative example, the right strut 139A and a left strut 139B are arranged such that circumferential phases of the entire right and left struts 139A and 139B, including coil springs 160 and lower spring seats 150 to position the respective coil springs 160, are shifted 180 degrees from each other. That is, the right and left struts 139A and 139B are arranged in point symmetry in plan view, which allows the load axes to be arranged in the above-described manner.

In this arrangement, the offset amount D10 of the lower end tip 161 of the coil spring 160 with respect to an axis C10 of the damper 140 in the vehicle's longitudinal direction is the same between the right and left struts 139A and 139B.

However, in the first comparative example, a spring force F10 of the coil spring 160 acting on the upper end of the damper 140 includes no component in the vehicle's longitudinal direction. When the upper end of the damper 140 receives the load F1 illustrated in FIG. 2, which acts in a direction inclined rearward toward the outside in the vehicle width direction, from the vehicle body 1, the load F1 cannot be offset by the spring force F10 of the coil spring 160. This configuration therefore has difficulty in effectively reducing the bending moment acting on the damper 140.

FIG. 7 illustrates the second comparative example in which the right and left struts 139A and 139B of the first comparative example as a whole are moved clockwise by the same angle in top view. In the second comparative example, too, the phases of the right and left struts 139A and 139B are shifted 180 degrees from each other, and the offset amount D20 of the lower front end tip 161 of the coil spring 160 with respect to the axis C10 of the damper 140 in the vehicle's longitudinal direction is the same between the right and left struts 139A and 139B.

In the second comparative example, the direction of the load axis of the coil spring 160 is inclined in the vehicle's longitudinal direction with respect to the vehicle width direction. In this case, the right strut 139A allows a spring force F20 of the coil spring 160 to act in a direction inclined rearward toward the top of the vehicle, and accordingly allows the load F1 from the vehicle body 1 to be offset by the spring force F20.

On the other hand, with regard to the left strut 139B, the load F1 from the vehicle body 1 cannot be offset by the spring force F30 because a spring force F30 of the coil spring 160 acts in a direction inclined rearward toward the top of the vehicle. This configuration therefore has difficulty in effectively reducing the bending moment acting on the damper 140.

The configuration of the present embodiment illustrated in FIG. 8 will now be described. In the following description, the strut 39 on the right side will be referred to as a right strut 39A, and the strut 39 on the left side will be referred to as a left strut 39B.

In the present embodiment, both of the right and left struts 39A and 39B are configured such that the respective load axes C2 (see FIG. 3 and FIG. 4) of the coil springs 60 are inclined frontward toward the top of the vehicle. This configuration allows, in each of the right and left struts 39A and 39B, the load F1 from the vehicle body 1 to be offset by the spring force (the load F2) of the coil spring 60, and is therefore capable of effectively reducing the bending moment acting on the damper 40.

In this embodiment, the load axes C2 of the coil springs 60 of the right strut 39A and the left strut 39B are bilaterally symmetric (with respect to the center line in the vehicle width direction) when viewed in both of the vehicle's longitudinal direction and the vertical direction. This configuration allows the spring force of the coil springs 60 of both of the right and left struts 39A and 39B to act, in a similar manner, on the respective upper ends of the dampers 40. Since the spring force of the coil spring 60 acts equally on the upper ends of the dampers 40 of the right and left struts 39A and 39B, the bending moment on the damper 40 is equally reduced in both of the struts 39.

In order to achieve the above arrangements of the load axes C2 of the coil springs 60, the circumferential phases of the entire right strut 39A and the entire left strut 39B are not shifted 180 degrees as in the conventional examples, but are shifted in a different manner. In other words, the right strut 39A and the left strut 39B are asymmetrically arranged in plan view.

This asymmetric arrangement may be employed at least for the coil springs 60, the lower spring seats 50, and the seat rubbers 54 of the right and left struts 39A and 39B, and other components may be in point symmetric similarly to the first comparative example.

In the present embodiment, the offset amounts D1 and D2 of the lower end tips 61 of the coil springs 60 with respect to the axes C1 of the dampers 40 in the vehicle's longitudinal direction, at the vertical positions where the lower end tips 61 of the coil springs 60 are located, are different between the right and left struts 39A and 39B. Such an asymmetric arrangement of the coil springs 60 of the right and left struts 39A and 39B can achieve an effective reduction of the bending moment on the dampers 40 of both of the right and left struts 39A and 39B.

Furthermore, in achieving the above configuration, the same coil spring 60 can be used for each of the right and left struts 39A and 39B, which is beneficial in reducing the cost of parts compared with a case in which the right and left struts 39A and 39B use different coil springs. The same coil spring 60 means coil springs having, for example, the same winding direction, same shape, same size, and same spring characteristics.

The present invention is not limited to the above embodiment, and any substitution can be made without departing from the spirit of the appended claims.

For example, in the above embodiment, the axis C1 of the damper 40 is inclined inward in the vehicle width direction and rearward in the vehicle's longitudinal direction, toward the top of the vehicle. The present invention is further applicable to a configuration in which the axis C1 of the damper 40 is inclined in a direction different from the direction of the above embodiment with respect to the vertical direction, or a configuration in which the axis C1 is arranged along the vertical direction.

The above embodiment is a mere example, and limited interpretation of the scope of the present invention is not allowed. The scope of the present invention is determined by the appended claims, and modifications and changes included in the equivalent of the appended claims are all included in the scope of the present invention.

INDUSTRIAL APPLICABILITY

As described above, the present invention is useful for a strut suspension device for vehicles with a damper and a coil spring.

DESCRIPTION OF REFERENCE CHARACTERS

1 Vehicle Body
6 Tie Rod
7 Steering Gearbox of Steering System
10 Front Suspension (Suspension Device for Vehicles)
20 Lower Arm
23 First Ball Joint (Connecting Portion of Lower Arm Connecting to Knuckle)
24 Second Ball Joint (Connecting portion of Tie Rod Connecting to Knuckle)
30 Wheel (Front Wheel, Steering Wheel)
35 Knuckle
39 Strut
40 Damper
46 Upper Spring Seat (Upper Spring Supporter)
50 Lower Spring Seat (Lower Spring Supporter)
60 Coil Spring
61 Lower End Tip of Coil Spring
C1 Axis of Damper
C2 Load Axis of Coil Spring
P1 Center of Upper End Portion of Coil Spring
P2 Center of Lower End Portion of Coil Spring

The invention claimed is:

1. A suspension device for a vehicle, comprising:
a knuckle configured to support a wheel of the vehicle;
a lower arm configured to connect the knuckle to a vehicle body of the vehicle;
a tie rod configured to connect the knuckle to a steering system;
a damper having an upper end connected to the vehicle body and a lower end connected to the knuckle, the damper being capable of extending and retracting in an axial direction of the damper;
a pair of upper and lower spring supporters mounted on the damper such that a distance from each other is changed in the axial direction of the damper according to the extending and retracting of the damper; and
a coil spring disposed between the pair of upper and lower spring supporters, wherein
of a connecting portion of the lower arm for connection to the knuckle and a connecting portion of the tie rod for connection to the knuckle, one of the connecting portions which is close to a rear of the vehicle is offset inward in a vehicle width direction with respect to the other connecting portion which is close to a front of the vehicle, in a steering neutral state,
a center of a lower end portion of the coil spring is offset outward in the vehicle width direction and rearward in a vehicle's longitudinal direction with respect to a center of an upper end portion of the coil spring,
a strut comprised of the damper and the coil spring is mounted on each of wheels on right and left sides of the vehicle,
offset amounts of the center of the lower end portion of the coil spring with respect to the center of the upper end portion of the coil spring in the vehicle width direction and in the vehicle's longitudinal direction are the same between the struts on the right and left sides of the vehicle body, and
an offset amount of a lower end of the coil spring with respect to the axis of the damper in the vehicle's longitudinal direction differs between the struts on the right and left sides of the vehicle body, at a vertical position of the lower end of the coil spring in the vertical direction of the vehicle.

2. The suspension device of claim 1, wherein
the center of the lower end portion of the coil spring is offset outward in the vehicle width direction and rearward in the vehicle's longitudinal direction with respect to the axis of the damper, at a vertical position of the center of the lower end portion in a vertical direction of the vehicle.

3. The suspension device of claim 1, wherein
the coil spring of the strut on the right side of the vehicle body and the coil spring of the strut on the left side of the vehicle body are wound in a same direction from respective upper ends toward lower ends.

4. A suspension device for a vehicle, comprising:
a knuckle configured to support a wheel of the vehicle;
a lower arm configured to connect the knuckle to a vehicle body of the vehicle;
a tie rod configured to connect the knuckle to a steering system;
a damper having an upper end connected to the vehicle body and a lower end connected to the knuckle, the damper being capable of extending and retracting in an axial direction of the damper;
a pair of upper and lower spring supporters mounted on the damper such that a distance from each other is changed in the axial direction of the damper according to the extending and retracting of the damper; and
a coil spring disposed between the pair of upper and lower spring supporters, wherein
of a connecting portion of the lower arm for connection to the knuckle and a connecting portion of the tie rod for connection to the knuckle, one of the connecting portions which is close to a rear of the vehicle is offset inward in a vehicle width direction with respect to the other connecting portion which is close to a front of the vehicle, in a steering neutral state,
the coil spring has a load axis arranged along a direction inclined outward in the vehicle width direction and rearward in a vehicle's longitudinal direction, toward a bottom of the vehicle,
a strut comprised of the damper and the coil spring is mounted on each of wheels on right and left sides of the vehicle body,
a load axis of the coil spring of the strut on the right side of the vehicle body and a load axis of the coil spring of the strut on the left side of the vehicle body are bilaterally symmetric when viewed in the vehicle's longitudinal direction and in a vertical direction of the vehicle, and
an offset amount of a lower end tip of the coil spring with respect to the axis of the damper in the vehicle's longitudinal direction differs between the struts on the right and left sides of the vehicle body, at a vertical position of the lower end tip of the coil spring in the vertical direction of the vehicle.

5. The suspension device of claim 4, wherein
the coil spring of the strut on the right side of the vehicle body and the coil spring of the strut on the left side of the vehicle body are wound in a same direction from respective upper ends toward lower ends.

6. A suspension device for a vehicle, comprising:
a knuckle configured to support a wheel of the vehicle;
a lower arm configured to connect the knuckle to a vehicle body of the vehicle;
a tie rod configured to connect the knuckle to a steering system;
a damper having an upper end connected to the vehicle body and a lower end connected to the knuckle, the damper being capable of extending and retracting in an axial direction of the damper;
a pair of upper and lower spring supporters mounted on the damper such that a distance from each other is changed in the axial direction of the damper according to the extending and retracting of the damper; and
a coil spring disposed between the pair of upper and lower spring supporters, wherein
of a connecting portion of the lower arm for connection to the knuckle and a connecting portion of the tie rod for connection to the knuckle, one of the connecting portions which is close to a rear of the vehicle is offset inward in a vehicle width direction with respect to the other connecting portion which is close to a front of the vehicle, in a steering neutral state, and
a center of a lower end portion of the coil spring is offset outward in the vehicle width direction and rearward in a vehicle's longitudinal direction with respect to a center of an upper end portion of the coil spring,
the center of the lower end portion of the coil spring is offset outward in the vehicle width direction and rearward in the vehicle's longitudinal direction with respect to the axis of the damper, at a vertical position of the center of the lower end portion in a vertical direction of the vehicle,
a strut comprised of the damper and the coil spring is mounted on each of wheels on right and left sides of the vehicle,
offset amounts of the center of the lower end portion of the coil spring with respect to the center of the upper end portion of the coil spring in the vehicle width direction and in the vehicle's longitudinal direction are the same between the struts on the right and left sides of the vehicle body, and
an offset amount of a lower end of the coil spring with respect to the axis of the damper in the vehicle's longitudinal direction differs between the struts on the right and left sides of the vehicle body, at a vertical position of the lower end of the coil spring in the vertical direction of the vehicle.

7. The suspension device of claim 6, wherein
the coil spring of the strut on the right side of the vehicle body and the coil spring of the strut on the left side of the vehicle body are wound in a same direction from respective upper ends toward lower ends.

\* \* \* \* \*